United States Patent [19]

Lee

[11] Patent Number: 5,761,423

[45] Date of Patent: Jun. 2, 1998

[54] SCALABLE PICTURE STORAGE ACCESS ARCHITECTURE FOR VIDEO DECODING

[75] Inventor: Charng Long Lee, Hsinchu, Taiwan

[73] Assignee: Industrial Technology Research Institute, Hsinchu, Taiwan

[21] Appl. No.: 557,922

[22] Filed: Nov. 14, 1995

[51] Int. Cl.⁶ .................................................. G11C 7/00
[52] U.S. Cl. ............................. 395/200.45; 365/189.04
[58] Field of Search .......................... 364/514 R, 715.02;
348/394, 403, 407, 416, 420, 699, 718;
365/189.04; 370/351, 356, 379; 382/236,
238; 395/114, 115, 117, 515, 517, 405,
475, 477, 200.45

[56] References Cited

U.S. PATENT DOCUMENTS

| | | | |
|---|---|---|---|
| 5,357,281 | 10/1994 | Lee. | |
| 5,379,070 | 1/1995 | Retter et al. . | |
| 5,386,233 | 1/1995 | Keith | 348/407 |
| 5,446,839 | 8/1995 | Dea et al. | 395/502 |
| 5,510,842 | 4/1996 | Phillips et al. | 348/426 |
| 5,532,744 | 7/1996 | Akiwumi-Assani et al. | 348/390 |
| 5,581,310 | 12/1996 | Vinekar et al. | 348/718 |

OTHER PUBLICATIONS

O. Duardo, S. Knauer, J. Mailhot, K. Mondal and T. Poon, *Architecture and Impementation of ICs for DSC-HDTV Video Decoder System*, IEEE Micro, Oct., 1992, pp. 22–27.

K.H. Chang, B.U. Lee, C. Solin, and Y.J. Park, *An Experimental Digital HDTV Video Decoder System*, Int. Broadcasting Convention, Sep. 16, 1994, pp. 70–75.

O. Franceschi and P. Marklund, *The HD-Divine Coding Algorithm*, Int. Workshop on HDTV 1992, Nov. 18–20, 1992, pp. 17–1 – 7–8.

*Primary Examiner*—James P. Trammell
*Assistant Examiner*—Thomas Peeso
*Attorney, Agent, or Firm*—Meltzer, Lippe, Goldstein et al.

[57] ABSTRACT

A memory architecture is disclosed for storing macroblocks of an anchor picture. Each macroblock is an i×j matrix of p blocks of n×m pixels, where i,j,m,n and p are integers, p>1 and p=i·j. The blocks of each macroblock are consistently ordinalled with an ordinal q, $0 \leq q \leq p-1$. The memory architecture enables p parallel decoding engines to simultaneously access different blocks of a predictive macroblock of pixels identified in the anchor picture. The memory architecture includes p simultaneously addressable memories. Each of the memories is for storing pixel data of mutually different blocks of each macroblock of the anchor picture. Specifically, each of the p memories is assigned to at least one $q^{th}$ ordinalled block of each macroblock of the anchor picture, which at least one $q^{th}$ ordinalled block is different from the ordinalled blocks assigned to each other memory. Each of the memories only stores the corresponding at least one $q^{th}$ ordinalled blocks of each macroblock of the anchor picture.

7 Claims, 4 Drawing Sheets

SCALABLE PICTURE STORAGE ACCESS ARCHITECTURE FOR VIDEO DECODING

FIELD OF THE INVENTION

The present invention relates to decoding compressed video. In particular, the present invention relates to a storage architecture for storing pictures in an optimized manner for use as predictors in motion compensated temporal decoding.

BACKGROUND OF THE INVENTION

The present invention relates to decoding compressed video. The invention is illustrated herein using the International Standards Organization (ISO) Motion Picture Experts Group (MPEG) 1 & 2 standards for compressing/encoding video and decoding/decompressing video. See ISO\IEC 11172-2: Information Technology-Coding of Moving Pictures and Associated Audio for Digital Storage Media at up to about1.5 Mbit/sec-Part 2 Video (MPEG-1 video); ISO\IEC 13818-2: Information Technology-Generic Coding of Moving Pictures and Associated Audio Information: Video (MPEG-2 video).

MPEG provides for compressing video by reducing both spatial and temporal redundancy. A good tutorial for MPEG-2 video compression is contained in D. Le Gall, *A Video Compression Standard for Multimedia Applications*, COMM. OF THE ACM, April, 1991. The contents of this document are incorporated herein by reference. Initially, the video signal is converted to a luminance signal Y and two chrominance signals Cr and Cb. The Y, Cr and Cb signals are then sampled to form pixels. However, the sampling rate need not be the same for the chrominance as for the luminance. This is illustrated in FIG. 1. According to 4:2:0 chrominance format, there are four pixels of luminance for each chrominance pixel. A segment of the sample space of a picture 10 is illustrated to show how the chrominance and luminance samples are distributed with respect to each other. A sample space 20 shows the distribution according to a 4:2:2 chrominance format, wherein the luminance and chrominance are sampled at the same rate in the vertical direction but where chrominance is sampled at one half the rate of luminance in the horizontal direction. Likewise, a sample space 30 shows a 4:4:4 chrominance format, wherein the sampling rates are the same for luminance and chrominance.

The sampled luminance and chrominance pixels are encoded by a video encoder which includes a spatial encoder and a temporal encoder. A spatial encoder 80 is shown in FIG. 2 including a discrete cosine transformer (DCT) 83, a quantizer (Q) 85, a variable length encoder (VLC) 87 and a video buffer verifier (VBV) 89. To spatially encode a picture, the luminance and chrominance pixels of the picture are divided into blocks of pixels, e.g., 8×8 blocks of pixels. Each block of pixels (i.e., a luminance block of pixels or a chrominance block of pixels) is discrete cosine transformed in the DCT 83 to produce a number of transform coefficients. The coefficients are read out of the DCT 83 in zig-zag fashion in relative increasing spatial frequency, from the DC coefficient to the highest vertical and horizontal AC coefficient. This tends to produce a sequence of coefficients containing long runs of near zero magnitude coefficients. The coefficients are quantized in the Q 85 which, among other things, converts the near zero coefficients to zero. The outputted sequence thus contains quantized coefficients with non-zero amplitude levels and runs (or subsequences) of zero amplitude level coefficients. The coefficients are then (zero) run-level encoded and variable length encoded in the VLC 87. The variable length encoded coefficients are inputted to a buffer 70. To prevent underflow or overflow of the buffer 70, the quantizer step size of the Q 75 is adjusted by the VBV 89.

Blocks which are solely spatially encoded, such as described above, are referred to as intrablocks because they are encoded based only on information self-contained in the block. An intra-picture or I picture is a picture which contains only intrablocks. (Herein, "picture" means field or frame as per MPEG-2 nomenclature.)

In addition to a spatial encoder, a temporal encoder 90 is provided to reduce temporal redundancy. Temporal encoding presumes that there is a high correlation between groups of pixels in one picture, and groups of pixels in another picture, of a sequence of pictures. Thus, a group of pixels can be thought of as moving from one relative position in one picture, called an anchor picture, to another relative position of another picture, with only small changes in luminosity and chrominance of its pixels. In MPEG, the group of pixels is a block of pixels, although such blocks need not be the same size as those on which spatial encoding is performed. For instance, as shown in FIG. 1, temporal encoding for a 4:2:0 chrominance format may be performed on "macroblocks" comprising four luminance blocks $Y_0$, $Y_1$, $Y_2$, $Y_3$ and one of each color chrominance block $C_r$ and $C_b$ used for spatial encoding. Note that the area of the picture covered by the four luminance blocks $Y_0$, $Y_1$, $Y_2$ and $Y_3$ is the same as the area covered by each of the chrominance blocks $C_r$ and $C_b$. Alternatively, a 4:2:0 chrominance format macroblock may contain eight luminance blocks $Y_0$, $Y_1$, $Y_2$, $Y_3$, $Y_4$, $Y_5$, $Y_6$ and $Y_7$ and two of each chrominance block $C_{r0}$, $C_{r1}$ and $C_{b0}$, $C_{b1}$. In the case of a 4:2:2 chrominance format, each macroblock comprises four luminance blocks $Y_0$, $Y_1$, $Y_2$, $Y_3$ and two chrominance blocks for each of the chrominance colors, i.e., $C_{r0}$, $C_{r1}$ and $C_{b0}$ and $C_{b1}$. In the case of a 4:4:4 chrominance format, each macroblock comprises four luminance blocks $Y_0$, $Y_1$, $Y_2$, $Y_3$, four red chrominance blocks $C_{r0}$, $C_{r1}$, $C_{r2}$ and $C_{r3}$ and four blue chrominance blocks $C_{b0}$, $C_{b1}$, $C_{b2}$, $C_{b3}$. Illustratively, the macroblocks occur at prespecified, adjacently aligned positions in the picture to be encoded.

The temporal coding proceeds as follows. A macroblock, in a picture to be encoded, is compared to different possible macroblock sized groups of pixels in a search window of a potential anchor picture, to determine the best matching macroblock sized group of pixels. This is illustrated in FIG. 3. The best matching macroblock sized group of pixels is referred to as a prediction or predictive macroblock as per MPEG nomenclature. Note that the predictive macroblock need not occur at any prespecified location but rather can be located at any pixel (or even half pixel) displacement within the search window of the anchor picture. A motion vector MV is determined which indicates the relative shift of the predictive macroblock in the anchor picture to the position of the macroblock to be encoded relative to the picture to be encoded. A difference is formed between the predictive macroblock and the macroblock to be encoded. This difference is referred to as the prediction error macroblock. The individual blocks of the prediction error macroblock are then spatially encoded using the spatial encoder 80.

Blocks which are temporally encoded are referred to as interblocks. Interblocks are not permitted in I pictures but are permitted in predictive pictures (P pictures) or bidirectionally predictive pictures (B pictures). P pictures are pictures which each only have a single anchor picture, which single anchor picture is presented in time before the P picture encoded therewith. Each B picture has an anchor picture that is presented in time before the B picture and an anchor picture that is presented in time after the B picture. (In B pictures, a predictive macroblock may be obtained from each anchor picture and then averaged for use as a predictor for encoding a macroblock of the B picture.) This dependence is illustrated in (FIG. 3 and) FIG. 4 by arrows. While P and B pictures can have interblocks, some blocks of P and B pictures may be encoded as intrablocks if an adequate matching predictive macroblock cannot be found therefore.

In the temporal encoder 90, it is first necessary to provide the anchor picture data for generating search windows. Thus, blocks of pictures, which have been discrete cosine transformed and quantized, are dequantized in the inverse quantizer ($Q^{-1}$) 91 and inversely discrete cosine transformed in the inverse discrete cosine transformer (IDCT) 92. The blocks of pixels of the anchor pictures thus reproduced are stored in picture memory 94. If necessary to reconstruct the reproduced block of an anchor picture (i.e., a P picture), a previous predictive block of pixels is added to the decoded prediction error block of pixels outputted by the IDCT 92 using adder 93.

Picture memory 94 outputs one or more search windows of pixels of the anchor pictures stored therein to motion estimator 95 which also receives an inputted macroblock of a picture to be temporally encoded. The motion estimator 95 determines the best matching macroblock sized group of pixels, i.e., the predictive macroblock, in the search window to the inputted macroblock to be encoded. The motion estimator 95 outputs the motion vector MV for translating the predictive macroblock thus formed to the location of the macroblock to be encoded. The predictive macroblock is subtracted from the macroblock to be encoded in subtractor 96 and the prediction error macroblock thus formed is spatially encoded by the spatial encoder 80. The motion vector MV is (variable length encoded) and multiplexed with the spatially encoded prediction error macroblock.

FIG. 5 shows a general architecture for a video decoder 60. Encoded intrablocks and interblocks (and associated motion vectors MV) are variable length decoded in variable length decoder (VLD) 61. The variable length decoded motion vectors MV are outputted to a motion compensator 63. The variable length decoded blocks are inverse quantized by a $Q^{-1}$ 65 and inverse discrete cosine transformed by IDCT 67. (A quantizer step size may also be outputted to $Q^{-1}$ 65.) The spatially decoded blocks of prediction error macroblocks (of P and B pictures) are inputted to the motion compensator 63. Using the corresponding motion vectors MV, the motion compensator 63 retrieves the blocks of appropriate predictive macroblocks, identified by the motion vector MV, from a picture memory 69. Each retrieved block of a predictive macroblock is then added to its respective block of a prediction error macroblock in an adder 68 to produce a reconstructed block of a picture. Decoded blocks of anchor pictures, whether solely spatially decoded, or reconstructed using temporal and spatial decoding, are stored in the picture memory 69 for later use in decoding interceded blocks of other pictures.

There have been some prior art proposals for improving the decoder 60. K. H. Chang, et al., *An Experimental Digital HDTV Video Decoder System*, INT. BROADCASTING CONVENTION. Sep. 16–20, 1994, p 70–75 and O. Franceschi & P. Marklund, The HD-DIVINE Coding Algorithm, INT. WORKSHOP ON HDTV 1992, Nov. 18–20, p.17.1–17.8 propose to divide each picture into horizontal or vertical slices. The slices are then decoded in parallel in a respective video decoder 60, wherein one video decoder is provided for each slice. O. Duardo, et al., *Architecture and Implementation of ICs for a DSC-HDTV Video Decoder System*, IEEE MICRO., Oct., 1992 22–27 teaches a video decoder architecture with separate encoders for chrominance and luminance. However, only a single picture memory is shared by the parallel video decoders. This presents a problem for accessing the picture memory 69. Specifically, each video decoder accesses the same picture memory 69 to retrieve appropriate blocks of predictive macroblocks since it is not economically feasible to provide a separate memory to each video decoder for storing an entire anchor picture. Thus, the video decoders contend for accessing the shared picture memory. To solve the memory contention issue, U.S. Pat. No. 5,357,282 proposed to interleave the pixels of each block into four separate video decoders according to a round-robin scheme. Each of the video decoders accesses the picture memory during a respective round-robin processing phase. U.S. Pat. No. 5,379,070 proposed to solve the memory contention issue by slicing the picture at the encoder.

None of the prior art solutions solves the memory contention problem in a fully flexible and scalable fashion which accommodates different sized pictures and different chrominance formats.

It is therefore an object of the present invention to overcome the disadvantages of the prior art.

SUMMARY OF THE INVENTION

This and other objects are achieved by the present invention. According to one embodiment, a memory architecture is provided for storing macroblocks of an anchor picture. Each macroblock is an i×j matrix of p blocks of n×m pixels, where i,j,m,n, and p are integers, p>1 and p=i·j. The blocks of each macroblock are consistently ordinalled with an ordinal q, 0<q<p−1. The memory architecture enables p parallel decoding engines to simultaneously access different blocks of a predictive macroblock of pixels identified in the anchor picture. The memory architecture includes p simultaneously addressable memories. Each of the memories is for storing pixel data of mutually different blocks of each macroblock of the anchor picture. Specifically, each of the p memories is assigned to at least one $q^{th}$ ordinalled block of each macroblock of the anchor picture, which at least one $q^{th}$ ordinalled block is different from the ordinalled blocks assigned to each other memory. Each of the memories only stores the corresponding at least one $q^{th}$ ordinalled blocks of each macroblock of the anchor picture.

Illustratively, a routing module is also provided which is connected between the decoding engines and the p memories. The routing engine is for routing each parallel memory access issued by the decoding engines to mutually different ones of the memories. The routing engine is also for simultaneously transitioning the parallel memory accesses issued by each of the decoding engines from memory to memory so that the memory accesses issued by the decoding engines are always to mutually different ones of the memories.

In short, the invention provides a picture memory access architecture for enabling plural parallel video decoding engines to access picture data. The invention enables parallel access without contention amongst the video decoding engines and is scalable, for example, to allow decoding of different chrominance formats or different size/resolution pictures.

DETAILED DESCRIPTION OF THE INVENTION

Figure 6:
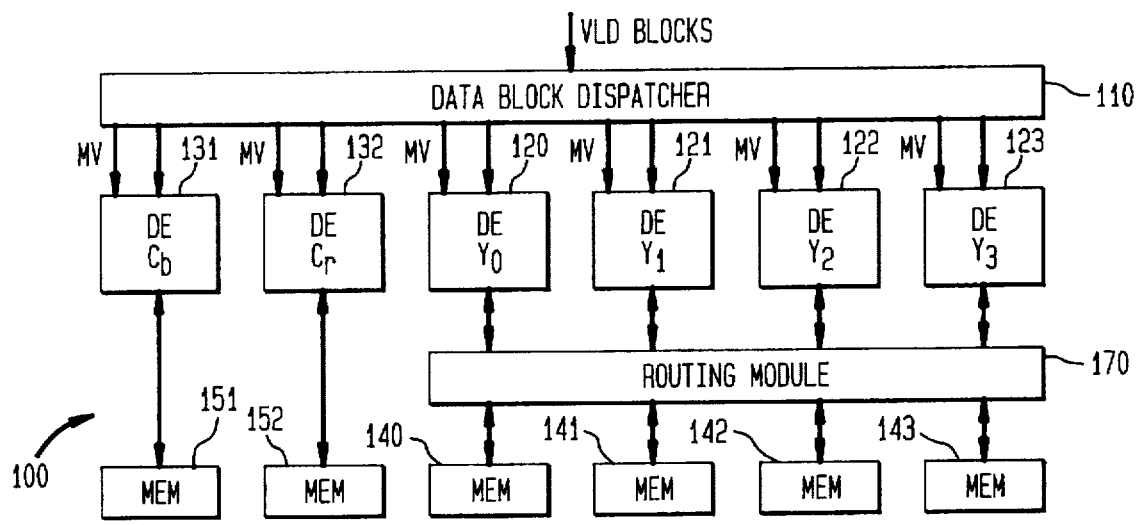
FIG. 6 shows a decoder according to an embodiment of the present invention.

FIG. 6 shows a video decoder 100 according to one embodiment of the invention. Illustratively, the video decoder 100 is for decoding a 4:2:0 chrominance format video bitstream with 2×2 luminance blocks, 1×1 red chrominance block and 1×1 blue chrominance block per macroblock. However, the invention applies to any format bitstream. Furthermore, the invention can be used for pictures of any size or resolution. For example, all levels of MPEG-2 can be accommodated by the invention.

As shown, the bitstream is received at a data block dispatcher 11 0 which separates the blocks of pixels associated with each encoded macroblock. Illustratively, these macroblocks and associated motion vectors are already presumed to be variable length decoder by a VLD, such as the VLD 61 of FIG. 5. The data block dispatcher 110 illustratively outputs, in parallel, the blocks of an encoded macroblock to the decoding engines 120, 121, 122, 123, 131 and 132. Specifically, the data block dispatcher outputs the encoded luminance block $Y_0$ to the decoding engine 120, the encoded luminance block $Y_1$ to the decoding engine 121, the encoded luminance block $Y_2$ to the decoding engine 122, the encoded luminance block $Y_3$ to the decoding engine 123, the encoded chrominance block $C_b$ to the decoding engine 131 and the encoded chrominance block $C_r$ to the decoding engine 132. In addition, the block dispatcher 110 outputs a copy of the corresponding motion vector to each decoding engine 120, 121, 122, 123, 131 and 132.

Figure 1:
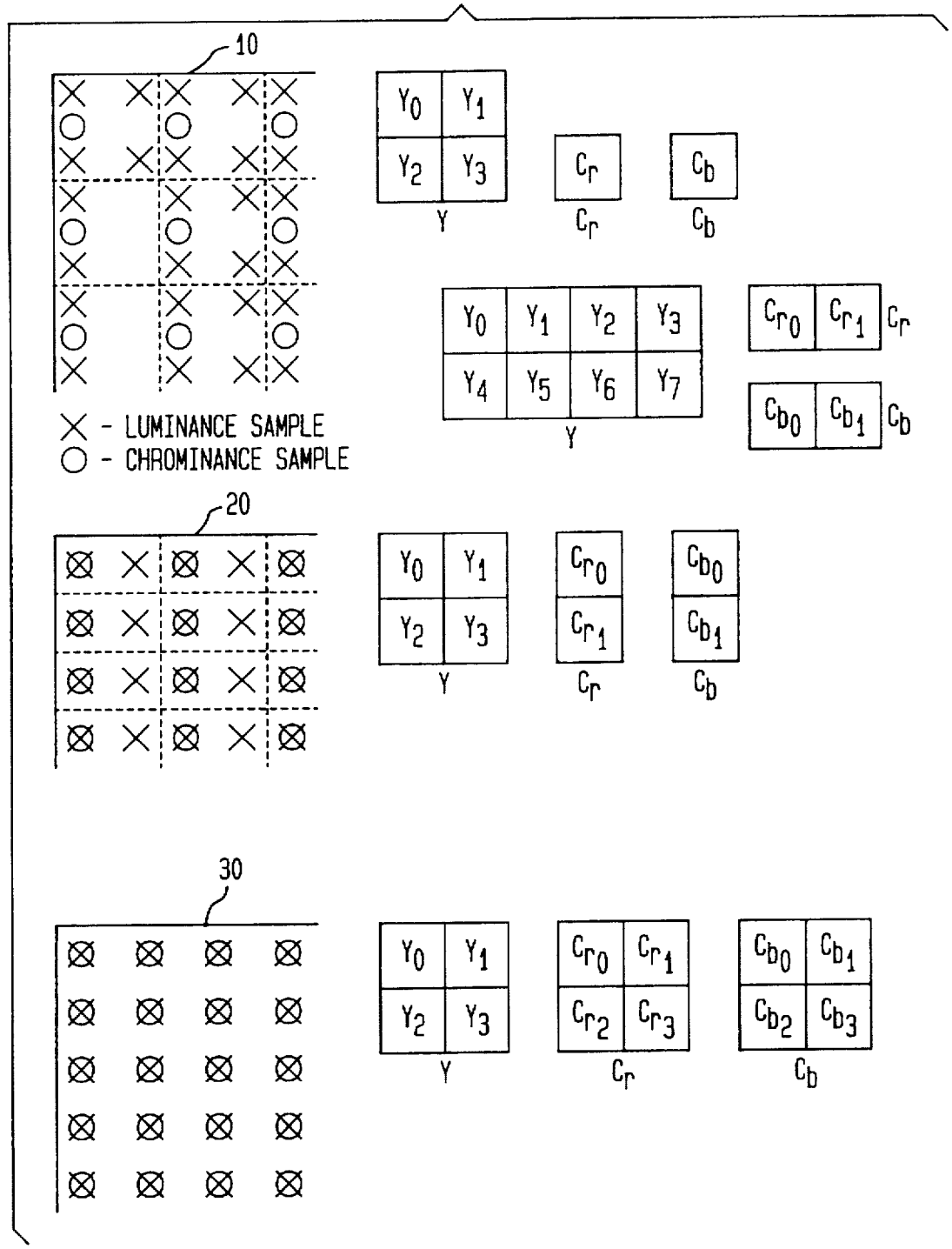
FIG. 1 shows different chrominance formats and corresponding macroblocks.
Figure 2:
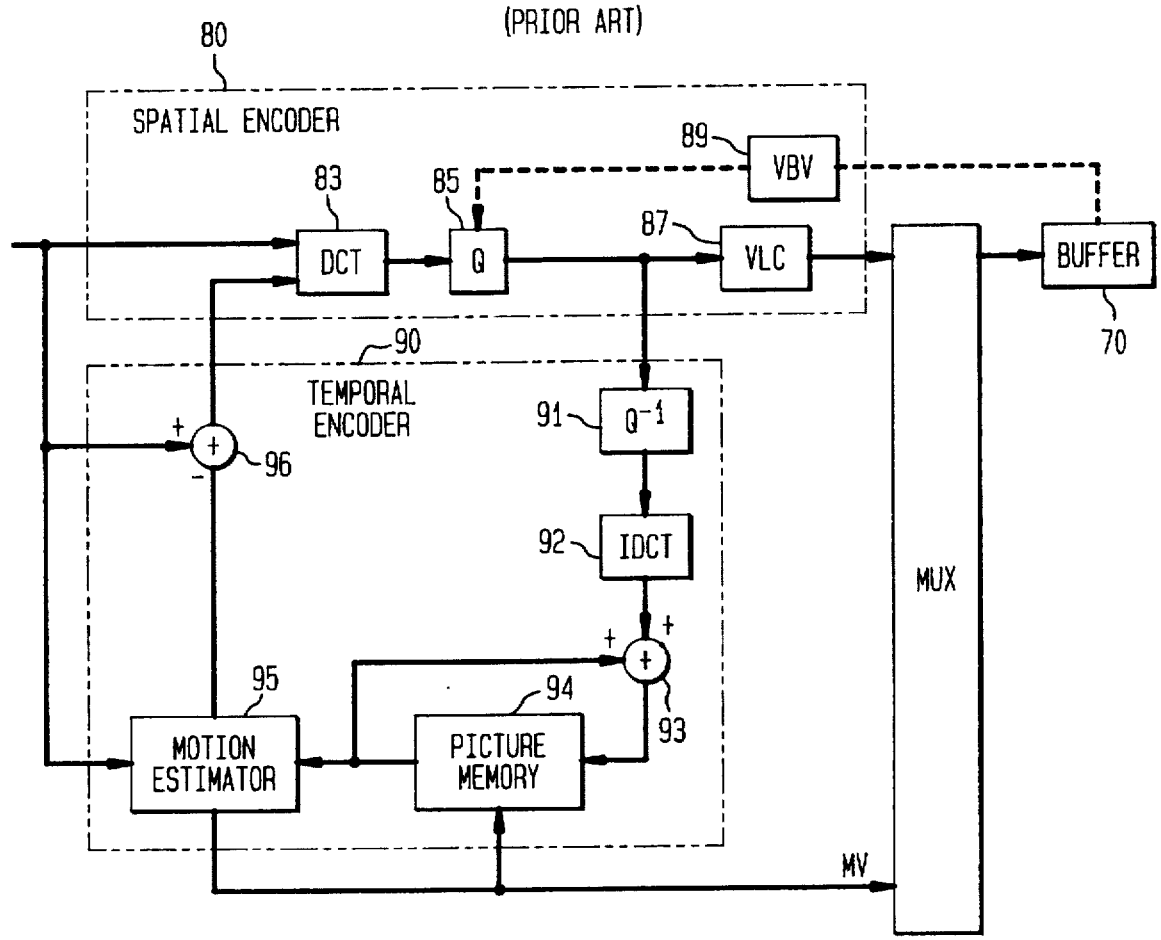
FIG. 2 shows a conventional video encoder.
Figure 3:
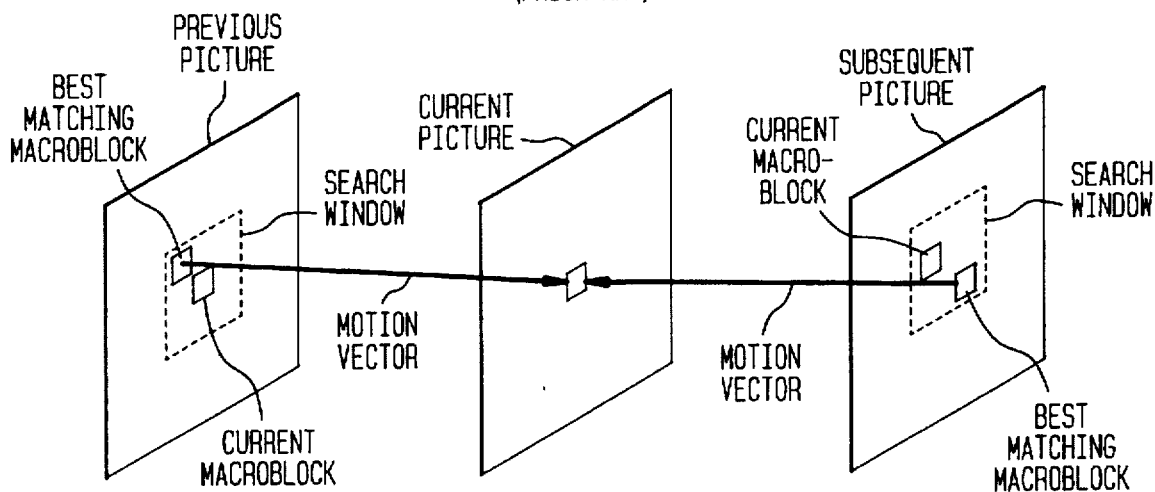
FIG. 3 illustrates motion estimation in the encoder of FIG. 2.
Figure 4:
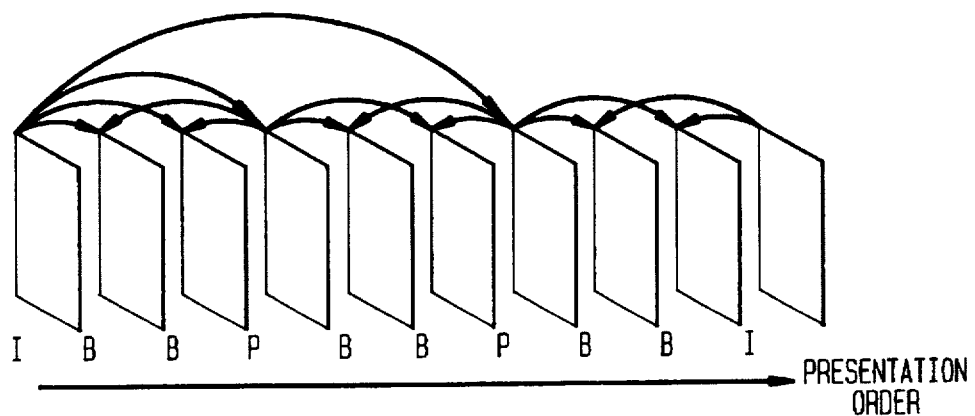
FIG. 4 illustrates the relationship of anchor pictures to predicted picture.
Figure 5:
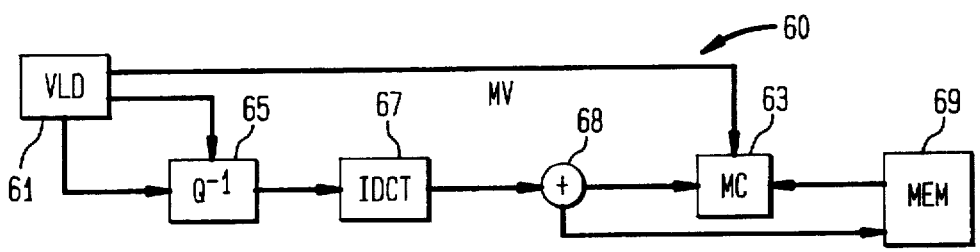
FIG. 5 shows a conventional decoder.

Each decoding engine 120, 121, 122, 123, 131 and 132 includes a $Q^{-1}$, IDCT and motion compensator interconnected to spatially and temporally decompress received encoded blocks and motion vectors, such as is depicted in FIG. 5. In order to temporally decompress an encoded block, each decoding engine 120, 121, 122, 123, 131 and 132 must be provided with anchor picture data from which to form predictive macroblocks. Note that for 4:2:0 chrominance format, only a single block for each color blue and red, namely, $C_b$ and $C_r$ are to be decoded for each macroblock. Illustratively, the decoding engine 131 which decompresses the block $C_b$ is the only decoding engine that accesses blue chrominance anchor picture data. Likewise, the decoding engine 132 which decompresses the block $C_r$ is the only decoding engine that accesses red chrominance anchor picture data. Thus, the blue chrominance anchor picture data may be stored in a memory 151 which is exclusively accessed by the decoding engine 131. Likewise, the red chrominance anchor picture data may be stored in a memory 152 which is exclusively accessed by the decoding engine 132. In short, for this 4:2:0 format illustration, neither the decoding engine 131 nor the decoding engine 132 contend against another decoding engine for access to the same picture data or the same memory.

Figure 7:
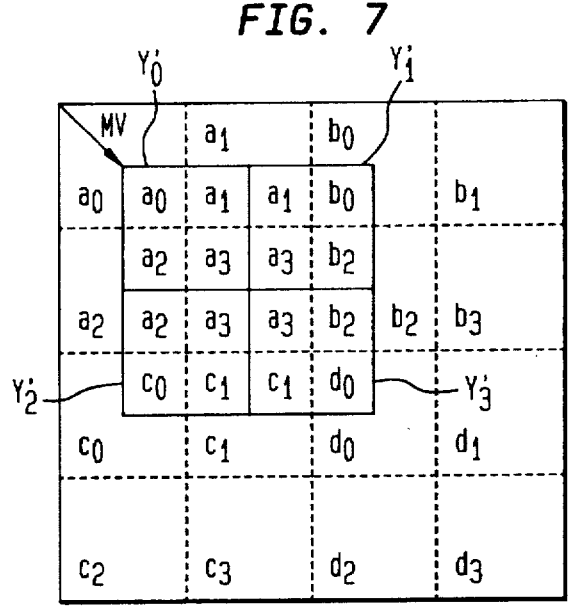
FIG. 7 illustrates the relationship between a predictive macroblock and the storage of picture data according to an embodiment of the present invention.

This is not so for luminance. The blocks $Y_0$, $Y_1$, $Y_2$ and $Y_3$ are spatially adjacent to each other. The particular data to be retrieved for motion compensating each of the encoded blocks depends on the motion vector. This is illustrated in FIG. 7 which shows a portion of an anchor picture with four luminance macroblocks A, B, C and D, where macroblock A contains the blocks $a_0$, $a_1$, $a_2$, $a_3$, macroblock B contains the blocks $b_0$, $b_1$, $b_2$, $b_3$, macroblock C contains the blocks $c_0$, $c_1$, $c_2$, $c_3$ and macroblock D contains the blocks $d_0$, $d_1$, $d_2$, $d_3$. Note that each anchor luminance block of each anchor luminance macroblock, e.g., the block $a_0$ of the macroblock A, is assigned an ordinaled number q=0,1,2, or 3 using the same convention as is used to number the prediction error luminance blocks $Y_0$, $Y_1$, $Y_2$ and $Y_3$. That is, the $q=0^{th}$ blocks $a_0$, $b_0$, $c_0$ and $d_0$ are the upper left hand corner blocks, the $q=1^{st}$ blocks $a_1$, $b_1$, $c_1$ and $d_1$ are the upper right hand corner blocks, the $q=2^{nd}$ blocks $a_2$, $b_2$, $c_2$ and $d_2$ are the lower left hand corner blocks and the $q=3^{rd}$ blocks $a_3$, $b_3$, $C_3$ and $d_3$ are the lower right hand corner blocks. Suppose a prediction macroblock is to be identified for a luminance macroblock $Y_0$, $Y_1$, $Y_2$, $Y_3$ occupying the same spatial coordinates as the macroblock A with a motion vector of (0,0). In such a case, the predictive block $Y_0'$ for $Y_0$ is $a_0$, the predictive block $Y_1'$ for $Y_1$ is $a_1$, the predictive block $Y_2'$ for $Y_2$ is $a_2$ and the predictive block $Y_3'$ for $Y_3$ is $a_3$. However, if the motion vector is (3,2), such as is shown in FIG. 7, then the predictive block $Y_0'$ includes some pixel data from each of the blocks $a_0$, $a_1$, $a_2$ and $a_3$, the predictive block $Y_1'$ includes some pixel data from each of the blocks $a_1$, $a_3$, $b_0$ and $b_2$, the predictive block $Y_2'$ includes some pixel data from each of the blocks $a_2$, $a_3$, $c_0$ and $c_1$, and the predictive block $Y_3'$ includes some pixel data from each of the blocks $a_3$, $b_2$, $c_1$ and $d_0$. Note, however, that for any motion vector, the following properties are true:

(1) Each predictive block of the predictive macroblock can be divided into K=1,2 or 4 regions of pixels, wherein the pixels of any given region are from the same block of the anchor picture. For instance, the block $Y_1'$ has first region of block $a_1$ pixels, a second region of block $a_3$ pixels, a third region of block $b_0$ pixels and a fourth region of block $b_2$ pixels. With the exception of a predictive macroblock which exceeds a boundary of an anchor frame, all predictive blocks of the macroblock have the same number of K regions. This is so because all predictive blocks $Y_0'$, $Y_1'$, $Y_2'$ and $Y_3'$ and all anchor blocks $a_0-a_3$, $b_0-b_0$, $c_0-c_3$ and $d_0-d_3$ have the same dimensions, namely n×m (8×8) pixels.

(2) Assume that each $k^{th}$ region, for k=1 to K, of each predictive block of a predictive macroblock, are numbered in a consistent fashion (e.g., $k=1^{st}$ region nearest the upper left hand corner, $k=2^{nd}$ region nearest the upper right hand corner, $k=3^{rd}$ region nearest the lower left hand corner and $k=4^{th}$ region nearest the lower right hand corner). Then for any value of k, the $k^{th}$ region of each predictive block $Y_0'$, $Y_1'$, $Y_2'$ and $Y_3'$ has identical dimensions. Note also that the $k^{th}$ region of each predictive block $Y_0'$, $Y_1'$, $Y_2'$ and $Y_3'$ contains pixels form a mutually different $q^{th}$ ordinalled anchor block of an anchor macroblock. For instance, for k=2, the $2^{nd}$ region of $Y_0'$ has pixels from block $a_2$ which is the $q=2^{nd}$ ordinalled block of macroblock A. The $2^{nd}$ region of $Y_1'$ has pixels from block $a_3$ which is the $q=3^{rd}$ ordinalled block of the macroblock A. The $2^{nd}$ region of $Y_2'$ has pixels from block $c_0$ which is the $q=0^{th}$ ordinalled block of the macroblock C. The $2^{nd}$ region of $Y_3'$ has pixels from the block $c_1$ which is the $q=1^{st}$ ordinalled block of the macroblock C. Form inspection, the $2^{nd}$ region of each predictive block $Y_0'$, $Y_1'$, $Y_2'$, and $Y_3'$ has identical dimensions.

According to an embodiment of the invention, a memory architecture 160 is provided for storing the anchor picture data in a fashion which eliminates the possibility of memory contention by the decoding engines 120–123 regardless of the value of the motion vector. A number p of memories 140–143 is provided which equals the number of decoding engines 120–123 which could contend against each other in accessing picture data, i.e., could access data in the same memory. In this case p=4. Each memory is assigned to a particular $q^{th}$ ordinalled block of each anchor picture macroblock. That is, the memory 140 is assigned to the $q=0^{th}$ ordinalled blocks $a_0$, $b_0$, $c_0$, $d_0$, etc. The memory 141 is assigned to the $q=1^{st}$ ordinalled blocks $a_1$, $b_1$, $c_1$, $d_1$, etc. The memory 142 is assigned to the $q=2^{nd}$ ordinalled blocks $a_2$, $b_2$, $c_2$, $d_2$, etc. The memory 143 is assigned to the $q=3^{rd}$ ordinalled blocks $a_3$, $b_3$, $c_3$, $d_3$, etc. The anchor picture blocks are then stored in the memory to which they are assigned. From the above two properties, this ensures that for any given value of k, the data of the $k^{th}$ region in each predictive block of an identified predictive macroblock is stored in a different one of the p memories.

To ensure that no contentions occur, a routing module 1 70 is provided for scheduling the simultaneous accessing of each memory 140–143 by the decoding engines 120–123. In particular, the routing module 170 causes the parallel accesses by the decoding engines 120–123 to be in mutually different ones of the memories 140–143. Furthermore, the routing module transitions the accesses of the decoding engines, in parallel, to maintain the accesses to mutually different ones of the memories 140–143. Illustratively, the routing module is implemented using finite state machines to operate as described below.

For example, consider the predictive macroblock example of FIG. 7. The routing module 170 may initially route the parallel access of the data modules as indicated in Table 1:

TABLE 1

| Decoding engine performing access | Memory to which access is routed | Accessed block |
|---|---|---|
| 120 | 140 | $a_0$ |
| 121 | 141 | $a_1$ |
| 122 | 142 | $a_2$ |
| 123 | 143 | $a_3$ |

Then the routing engine 170 may simultaneously transition the accessing of memories as shown in Table 2:

TABLE 2

| Decoding engine performing access | Memory to which access is routed | Accessed block |
|---|---|---|
| 120 | 141 | $a_1$ |
| 121 | 140 | $b_0$ |
| 122 | 143 | $a_3$ |
| 123 | 142 | $b_2$ |

This is possible because each decoding engine 120–123 accessed an equal amount of data in the region k=1 from the respective memory 140–143. Since each decoding engine 120–123 is assumed to be identical, all decoding engines 120–123 perform their accessing simultaneously and complete the processing of the accessed data simultaneously. Likewise, the routing module 170 can then simultaneously transition the parallel accesses of the memories 140–143 as shown in Table 3:

TABLE 3

| Decoding engine performing access | Memory to which access is routed | Accessed block |
|---|---|---|
| 120 | 142 | $a_2$ |
| 121 | 143 | $a_3$ |
| 122 | 140 | $c_0$ |
| 123 | 141 | $c_1$ |

Again this is possible because the decoding engines 120, 121, 122 and 123 accesses, in parallel, the same amount of data in the $k=2^{nd}$ region from the corresponding memory, 141, 140, 143 and 142, respectively. Finally, the routing module 170 simultaneously transitions the parallel accesses by the decoding engines 120–123 of 140–143 as shown in Table 4:

TABLE 4

| Decoding engine performing access | Memory to which access is routed | Accessed block |
|---|---|---|
| 120 | 143 | $a_3$ |
| 121 | 142 | $b_2$ |
| 122 | 141 | $c_1$ |
| 123 | 140 | $c_0$ |

As before, the transition is possible because the decoding engines 120, 121, 122 and 123 access, in parallel, the same amount of data in the $k=3^{rd}$ region from the corresponding memory 142, 143, 140 and 141, respectively.

The routing module 170 may thus operate in an anlogous fashion as a multiultiplexer parallel switch or multiplexer model, wherein each switch is for connecting a decoding engine 120–123 with a selected one of the memories 140–143. Each switch transitions the connection of the memories 140–143 to a respective decoding engine in parallel and according to a predefined sequence. For instance, the access sequence for generating each respective predictive block $Y_0'$, $Y_1'$, $Y_2'$ and $Y_3'$ may be as follows:

$Y_0' \leftarrow (140, 141, 142, 143)$
$Y_1' \leftarrow (141, 140, 143, 142)$
$Y_2' \leftarrow (142, 143, 140, 141)$
$Y_3' \leftarrow (143, 142, 141, 140)$ Once the decoding engines 120–123, 131–132 have completed decoding the encoded blocks, the reconstructed blocks may stored in the appropriate memories 140–143, 151–152 for use as anchor picture data for a subsequent decoding operation. The decoding engine 131 writes the reconstructed block $C_b$" into the memory 151. The decoding engine 132 writes the reconstructed block $C_r$" into the memory 152. The decoding engine 120 writes the reconstructed block $Y_0$" into the memory 140. The decoding engine 121 writes the reconstructed block $Y_1$" into the memory 141. The decoding engine 122 writes the reconstructed block $Y_2$" into the memory 142. The decoding engine 123 writes the reconstructed block $Y_3$" into the memory 143.

The invention is easily scaled to accommodate different formats. For 4:2:2 chrominance format, there are a total of eight parallel decoding engines, one for decoding each prediction error block $Y_0$, $Y_1$, $Y_2$, $Y_3$, $C_{r0}$, $C_{r1}$, $C_{b0}$ and $C_{b1}$. Likewise, eight memories are provided. Four of the memories store luminance anchor picture macroblocks, two of the memories store red chrominance anchor picture macroblocks and two of the memories store blue chrominance anchor picture macroblocks. In accordance with the above memory architecture model, each of the four memories that store luminance macroblocks, is assigned to, and only stores the pixel data of, a different $q^{th}$ ordinalled block of each luminance macroblock. Likewise, each of the two memories that stores red chrominance anchor picture macroblocks, is assigned to, and only stores the pixel data of, a different $q^{th}$ ordinalled block of each red chrominance anchor picture macroblock. Furthermore, each of the two memories that stores blue chrominance anchor picture macroblocks, is assigned to, and only stores the pixel data of, a different $q^{th}$ ordinalled block of each blue chrominance anchor picture macroblock. Illustratively three routing modules are provided. One routing module is provided for controlling the accesses of the decoding engines, which decode the blocks $Y_0$, $Y_1$, $Y_2$, $Y_3$, to the four memories which contain the luminance macroblocks of the anchor pictures. A second routing module controls the accesses of the two decoding engines, which decode the blocks $C_{r0}$, $C_{r1}$, to the two memories which store the red chrominance macroblocks of the anchor pictures. The third routing module controls the accesses of the two decoding engines, which decode the blocks $C_{b0}$, $C_{b1}$, to the two memories which store the blue chrominance macroblocks of the anchor pictures.

In the case of 4:4:4 chrominance format, twelve memories are provided including four memories for storing luminance blocks, four memories for storing red chrominance blocks and four memories for storing blue chrominance blocks. Twelve parallel decoding engines, including four for decoding luminance prediction error blocks $Y_0$, $Y_1$, $Y_2$ and $Y_3$, four for decoding red chrominance prediction error blocks $C_{r0}$, $C_{r1}$, $C_{r2}$ and $C_{r3}$ and four for decoding blue chrominance prediction error blocks $C_{b0}$, $C_{b1}$, $C_{b2}$ and $C_{b3}$, are provided. The storage of luminance, red chrominance or blue chrominance anchor picture macroblocks in its respective group of four memories is identical to that described above for luminance in 4:2:0 chrominance format. Three routing modules are provided. A first routing module routes accesses between the luminance decoding engines and the memories which store luminance anchor picture macroblocks. A second routing module routes accesses between the red chrominance decoding engines and the memories which store red chrominance anchor picture macroblocks. The third routing module routes accesses between the blue chrominance decoding engines and the memories which store blue chrominance anchor picture macroblocks.

In the case of the 4:2:0 chrominance format with a luminance block containing 2×4 blocks $Y_0$, $Y_1$, $Y_2$, $Y_3$, $Y_4$, $Y_5$, $Y_6$, $Y_7$ and 1×2 red and blue chrominance blocks $C_{r0}$, $C_{r1}$ and $C_{b0}$, $C_{b1}$, twelve parallel decoders and twelve memories are needed. Three routing modules are also needed. A first routing module routes accesses between the eight luminance decoding engines and the eight memories which store luminance anchor picture macroblocks. A second routing module routes accesses between the two red chrominance decoding engines and the two memories which store red chrominance anchor picture macroblocks. The third routing module routes accesses between the two blue chrominance decoding engines and the two memories which store blue chrominance anchor picture macroblocks.

Figure 8:
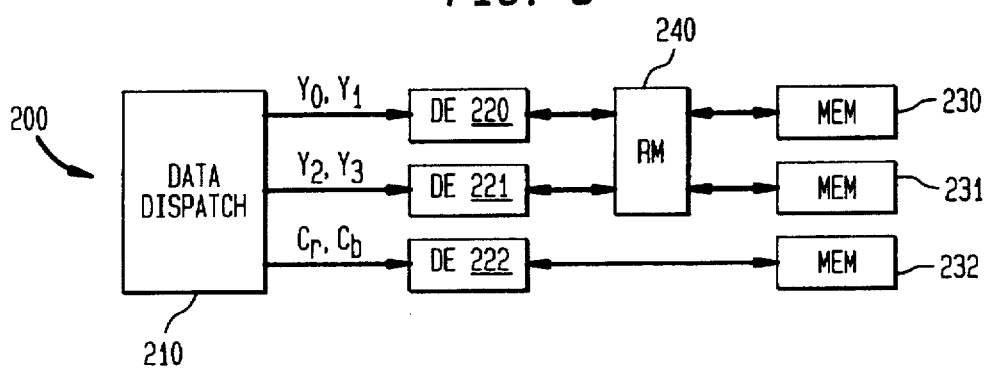
FIG. 8 shows a decoder according to a second embodiment of the present invention.

Future decoding architectures may have decoding engines which can each sequentially decode more than one block in real time. One such decoder 200 is depicted in FIG. 8. A data dispatcher 210 sequentially dispatches prediction error blocks $Y_0$, $Y_1$ to decoding engine 220, prediction error blocks $Y_2$, $Y_3$ to decoding engine 221 and prediction error blocks $C_r$, $C_b$ to decoding engine 222. Three memories 230, 231 and 232 are provided. The memory 232 contains the red and blue chrominance anchor picture macroblocks and is accessed only by the decoding engine 222. The memories 230 and 231 both store luminance anchor picture macroblocks and are accessed by both the decoding engines 220 and 221. As before, the memories 230 and 231 store luminance data in a fashion which avoids contention between the decoding engines 220 and 221. In particular, each memory is assigned to two ordinaled blocks of each anchor picture luminance macroblock. That is, the memory 220 is assigned to the ordinalled blocks q=0 and 1 and the memory 221 is assigned to the ordinalled blocks q=2 and 3. A routing module 240 is illustratively provided for routing all of the parallel accesses issued by the decoding engines 220 and 221 to separate memories 230 and 231. The routing module 240 also simultaneously transitions (i.e., switches) the accesses issued by the decoding engines 220 and 221 amongst the memories 230 and 231.

In short, a memory architecture is provided for enabling multiple parallel decoding engines to access anchor picture data in a non-contentious manner. The inventive architecture is modular, simple and easily scaled.

Finally, the above discussion is intended to be merely illustrative. Those having ordinary skill in the art may devise numerous alternative embodiments without departing from the spirit and scope of the following claims. For instance, the invention can be modified for application in DTV, HDTV, and all levels of MPEG-2. The invention can also be used in arts other than video decoding which use motion compensation such as, camera motion reduction circuitry, standards converters, etc.

The invention claimed is:

1. A memory architecture for storing macroblocks of an anchor picture, wherein each macroblock is an I×j matrix of p blocks of n×m pixels, where p>1 and p=I·j, wherein said blocks of each macroblock are consistently ordinalled with an ordinal q, $0 \leq q \leq p-1$, said memory architecture for enabling p parallel decoding engines to simultaneously access different blocks of a predictive macroblock of pixels identified in said anchor picture, said memory architecture comprising:

p simultaneously addressable memories, each of said memories for storing data mutually different blocks of each macroblock of said anchor picture, such that each of said p memories is assigned to one $q^{th}$ ordinalled block of each macroblock of said anchor picture, wherein said one $q^{th}$ ordinalled block is different from the ordinalled blocks assigned to each other of said p memories, each of said memories only storing said corresponding one $q^{th}$ ordinalled blocks of each macroblock of said anchor picture.

2. A process for enabling p parallel decoding engines to simultaneously access different blocks of a predictive macroblock of pixels identified in an anchor picture, wherein said anchor picture comprises plural adjacent macroblocks, wherein each anchor picture macroblock is an I×j matrix of p blocks of n×m pixels, where p>1 and p=I·j, wherein said blocks of each anchor picture macroblock are consistently ordinalled with an ordinal q, $0 \leq q \leq p-1$, said process comprising the steps of:

storing data of said blocks of each macroblock of said anchor picture in mutually different ones of p simultaneously addressable memories, such that each of said p memories is assigned to one $q^{th}$ ordinalled block of each macroblock of said anchor picture, wherein said one $q^{th}$ ordinalled block is different from each other ordinalled block assigned to each other of said p memories, each of said memories only storing said corresponding one $q^{th}$ ordinalled blocks of each macroblock of said anchor picture.

3. The method of claim 2 further comprising the step of:

simultaneously, for each of said p parallel decoders, accessing picture data in a first one of said p memories such that each of said p decoders accesses picture data in a different one of said p memories.

4. The method of claim 3 further comprising the step of:

simultaneously, for each of said p parallel decoders, ceasing to access picture data in said first one of said p memories and accessing picture data in a second one of said p memories such that each of said p decoders accesses picture data in a different one of said p memories.

5. The method of claim 2 further comprising the steps of:

using a motion vector, identifying a predictive macroblock containing i×j predictive blocks that each correspond to a different respective predictive error block decoded by a respective one of said decoding engines, and simultaneously outputting data for each predictive block from said p memories.

6. A decoder comprising:

p parallel decoding engines for decoding a different prediction error block of a prediction error macroblock, and p simultaneously addressable memories, for storing macroblocks of an anchor picture, wherein each macroblock is an I×j matrix of p blocks of n×m pixels, where p>1 and p=I·j, wherein said blocks of each macroblock are consistently ordinalled with an ordinal q, $0 \leq q \leq p-1$, said p memories for enabling said p parallel decoding engines to simultaneously access different blocks of a predictive macroblock of pixels identified in said anchor picture, wherein each of said memories stores data of mutually different blocks of each macroblock of said anchor picture, such that each of said p memories is assigned to one $q^{th}$ ordinalled block of each macroblock of said anchor picture, wherein said one $q^{th}$ ordinalled block is different from the ordinalled blocks assigned to each other of said p memories, each of said memories only storing said corresponding one $q^{th}$ ordinalled blocks of each macroblock of said anchor picture.

7. The decoder of claim 6 further comprising:

a routing module, connected between said decoding engines and said p memories, for routing each parallel memory accesses issued by said decoding engines to mutually different ones of said memories and for simultaneously transitioning said accesses issued by each of said parallel decoding engines from memory to memory so that said memory accesses issued by said decoding engines are always to mutually different ones of said memories.

* * * * *